July 4, 1950  W. R. THOMAS  2,513,599

IDLER PULLEY CONSTRUCTION

Filed March 31, 1949

*INVENTOR.*
WILLIAM R. THOMAS
BY  *Darby & Darby*
ATTORNEYS

Patented July 4, 1950

2,513,599

UNITED STATES PATENT OFFICE 2,513,599

IDLER PULLEY CONSTRUCTION

William Renshaw Thomas, Hazleton, Pa., assignor to Thoren Engineering Company, Hazleton, Pa., a co-partnership Application March 31, 1949, Serial No. 84,534

3 Claims. (Cl. 308—190)

The present invention is concerned with improvements in the construction of idler pulleys and bearings therefor. It is especially adapted for use as a pulley for long belts shown encountered in textile machinery.

Among the problems encountered in designing and manufacturing a satisfactory pulley are the production of high rigidity and high mechanical strength accompanied by positive concentricity between inner and outer diameters and a good balancing, accompanied by the elimination of distortion during manufacture. These factors are provided by the present design and in addition air circulation is created which dissipates any heat generated by normal bearing operation.

A further desirable characteristic of such pulleys is to have a minimum weight of rotating mass whereby the load on the pulley bearings is reduced resulting in materially increased bearing life and also resulting in a lower horsepower requirement for operation, producing maximum economy. These features, together with the production of a superior smooth surface finish which prevents undue wear of the belt, are provided by the present device by forming it by molding of a reinforced phenolic compound which, in addition to having the characteristics just recited, also has high strength.

The present invention also provides an improved bearing design which admits of easy disassembly and reassembly of the pulley components whenever desired without damage; it also provides a positive seal against dust, dirt, lint or other elements detrimental to the life of antifriction bearings and yields inspection of the bearing and relubrication thereof when necessary with a minimum of effort and cost, while at the same time preventing excess lubrication since no pressure lubrication is afforded, thus reducing losses and failures both to the bearing and to the products being manufactured which may be caused by excess lubrication.

The bearing in the present device uses a moderately large spindle diameter forming integrally the inner race for anti-friction bearings thereby reducing vibration factors to a minimum. Moderately large bearing diameters and bearing lengths provide relatively large areas of contact, thereby preventing harmful stresses in the materials involved. The pulley thus provided is extremely rugged in design, being stronger than cast metal pulleys of equivalent dimensions, and is adapted for manufacture at low cost, has light weight which reduces shipping charges, and has strength and load handling abilities adapted to a wide variety of idler pulley uses.

Figure 1:
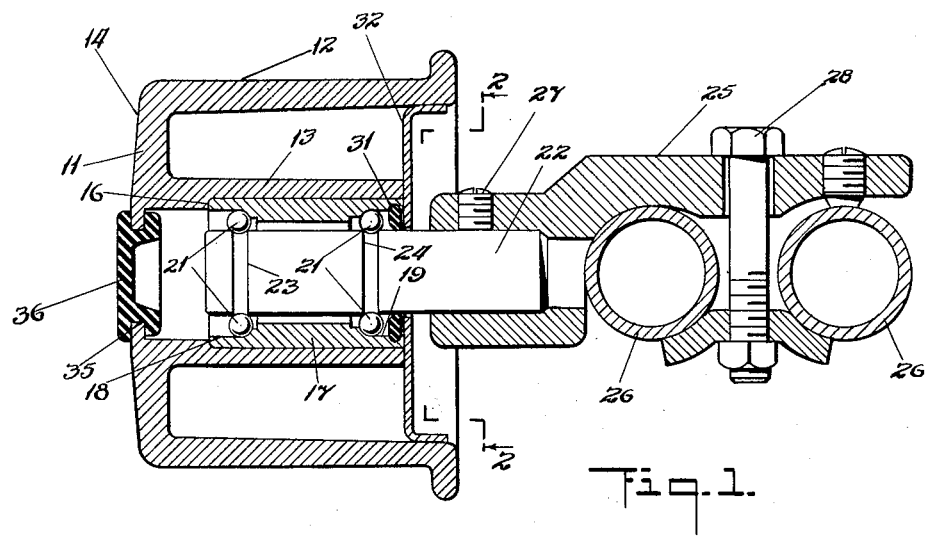
Figure 2:
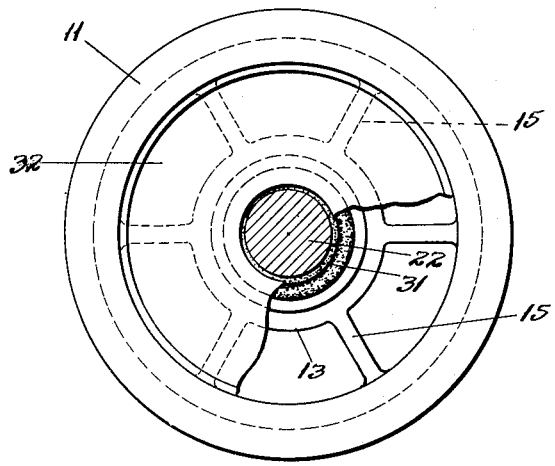

These and other advantages and objects of the present invention will become more apparent from consideration of the following description of a preferred embodiment thereof, accompanied by reference to the appended drawing, in which Figure 1 is a longitudinal cross-sectional view of the pulley, bearing and mounting therefor according to the present invention; and Figure 2 is a cross-sectional view of the device of Figure 1 along line 2—2 thereof.

Referring to the drawings, there is shown the pulley 11 preferably molded of reinforced phenolic material having a high strength and producing a smooth surface finish on the outer cylindrical surface 12 adapted to cooperate with a belt to be supported by the pulley. The outer drum 12 of pulley 11 is made thick enough for desired strength and is joined to the inner hub 13 of the pulley by the end bell 14 and a plurality of radial ribs 15, all integrally formed with the pulley 11 to provide a rigid but light weight structure. The hub 13 is provided with a shoulder 16 and surrounds the cylindrical bearing sleeve 17 which is preferably rigidly fixed to the pulley 11 by having the pulley 11 shrunk therearound. This may be done, for example, by inserting the bearing sleeve 17 into the bore of the hub 13 immediately after the pulley is withdrawn from the mold in which it is formed and while the pulley is still hot. The consequent shrinkage of the pulley due to cooling tightly retains the bearing sleeve 17 within the pulley hub 13. The bearing sleeve 17 is recessed at 18 and 19 to provide bearing races for anti-friction bearings, such as the ball bearings indicated at 21. The pulley 11 is rotatably mounted on a spindle 22 which is grooved at 23 and 24 opposite the recesses 18 and 19 on bearing sleeve 17 to provide the inner races for the bearing balls 21.

The spindle 22 in turn may be supported in a bracket 25 and secured thereto as by set screw 27 adjustably positioned, as by means of a bolt 28, along rails 26 conventionally forming part of the apparatus on which the pulley is to be mounted. It will be understood that bracket 25 may be mounted in any desired position where the pulley is to be used, and may be modified as desired since it forms, per se, no part of the present invention; any other type of mounting for spindle 22 may be used, as desired.

Conventional retaining rings (not shown) may be used to keep the balls 21 within their respective races or, where expedient, such rings may be omitted. A lubricant retaining seal 31, formed for example of neoprene, rubber or the like, is preferably positioned between spindle 22 and bearing sleeve 17 to retain lubricant within the bearing at one end. A sheet metal disc seal 32 is also provided for the purpose of protecting the ribs 15 of the pulley and for preventing fan action by the ribs where this may be undesired in textile work. However, where desired, this disc seal 32 may be omitted, to obtain air circulation by fan action of the ribs 15, whereby improved bearing cooling is obtained.

As shown in Figure 1 the bearing sleeve 17 abuts against the shoulder 16 in the inner bore of pulley 11, thereby accurately positioning the bearing relative to the pulley. In assembly the spindle 22, bearing sleeve 17, bearing balls 21 and the seal 31, if used, are first assembled before the pulley itself is molded, and then the entire assembly is introduced into the hot pulley immediately after its extraction from the mold, so as to produce a shrunk fit of the pulley upon the bearing sleeve, as indicated above. As shown in Figure 1 the bore of the pulley extends beyond (to the left of the figure) the spindle 22 and the bearing sleeve 17. An inwardly extending lip 35 is provided at the left edge of the pulley slightly restricting the bore thereof. A flexible lubricant retaining plug 36, such as of neoprene, rubber or the like, is then positioned within the end of the bore of pulley 11, being retained in position by the lip 35. This plug 36 is adapted to be easily removed and thereby provides an inspection opening and also a lubricant opening, since by removal of the plug 36 the lubricant in the bearing may be readily repacked and then retained in position. This feature of the invention is an extremely important one since it provides a positive seal against dust, dirt, lint and other detrimental elements, permits ready inspection and relubrication, and also permits disassembly and reassembly of the pulley components where desired or necessary.

It will thus be seen that the present invention provides an extremely simple, yet rugged, light weight and low cost idler pulley which may be readily fabricated in a simple manner to provide excellent service for wide variations in load conditions and use. At the same time the pulley permits easy inspection and relubrication when necessary.

It will be understood that the above is a description of merely one illustrative embodiment of the present invention and is not to be taken in a limiting sense but solely as illustrative since many variations coming within the scope of the present invention will be apparent to those skilled in the art. The present invention is to be considered limited solely by the appended claims.

What is claimed is:

1. An idler pulley construction comprising a molded pulley having an outer drum and an inner hub joined thereto by a closed end and radially extending symmetrically arranged ribs, said hub having a generally cylindrical bore extending axially therethrough, a spindle adapted to be fixedly mounted to a support and having a pair of annular grooves adapted to be utilized as the inner races of anti-friction bearings, a cylindrical bearing sleeve having annularly extending recesses at the inner bore thereof corresponding to said spindle grooves and adapted to be utilized as the outer races of said bearings, a plurality of anti-friction bearing balls positioned between said spindle and said sleeve and contained within said grooves and recesses, said pulley having a shrunk fit with said bearing sleeve and further having an axial dimension greater than that of said sleeve whereby said pulley extends beyond said sleeve in one direction, said pulley also having an inwardly extending lip at one end narrowing the bore of said hub, and a removable flexible resilient lubricant-retaining and inspection plug supported within said bore by means of said lip.

2. An idler pulley construction as in claim 1 further including a disc positioned within said pulley drum and enclosing said pulley ribs within said drum, end, hub and disc to prevent circulation of air by fan action of said ribs.

3. An idler pulley construction comprising a bearing having a fixed spindle, a rotatable cylindrical bearing sleeve surrounding said spindle, and anti-friction bearing balls between said spindle and sleeve to permit substantially frictionless rotation of said sleeve about said spindle, a molded pulley having a hub shrunk about said sleeve and with a bore extending beyond said sleeve in one direction, said pulley having an inwardly extending lip at the end of said bore beyond the end of said bearing sleeve whereby said lip decreases the cross-sectional area of said bore, and a flexible resilient lubricant-retaining and inspection plug seated within said bore and retained by said lip, said plug being readily removable to permit easy inspection and lubrication of said bearing, said pulley having an outer drum concentrically positioned with respect to said hub and joined thereto by a plurality of radially extending ribs and also by an end disc, said hub, lip, drum and end disc being integrally molded of phenolic resin material to provide a light weight smooth-surfaced, durable, and inexpensive pulley which is self-cooled by the fan action of said ribs.

WILLIAM RENSHAW THOMAS.

REFERENCES CITED

The following references are of record in the file of this patent:

UNITED STATES PATENTS

| Number | Name | Date |
|---|---|---|
| 1,944,713 | Koons | Jan. 23, 1934 |
| 2,015,352 | Reid | Sept. 24, 1935 |
| 2,275,325 | Searles | Mar. 3, 1942 |